United States Patent [19]

Liu

[11] Patent Number: 4,814,380

[45] Date of Patent: Mar. 21, 1989

[54] POLYETHERIMIDE ESTER ELASTOMERIC BLENDS

[75] Inventor: Nan-I Liu, Mt. Vernon, Ind.

[73] Assignee: General Electric Company, Mt. Vernon, Ind.

[21] Appl. No.: 138,855

[22] Filed: Dec. 29, 1987

[51] Int. Cl.$^4$ .............................................. C08L 77/00
[52] U.S. Cl. ....................................... 525/66; 525/67; 525/92; 525/148
[58] Field of Search .................... 525/66, 67, 92, 902, 525/146, 425, 433, 426

[56] References Cited

U.S. PATENT DOCUMENTS 4,587,299  5/1986  Giles, Jr. ................................ 525/92

*Primary Examiner*—Theodore E. Pertilla
*Attorney, Agent, or Firm*—William F. Mufatti; Daniel De Joseph

[57] ABSTRACT

Novel thermoplastic elastomeric molding compositions having excellent physical properties, which comprise a polyetherimide ester elastomer modified with a combination of poly(butylene terephthalate), a monoalkenyl arene-conjugated diene copolymer and a polycarbonate.

43 Claims, No Drawings

POLYETHERIMIDE ESTER ELASTOMERIC BLENDS

The present invention relates to novel thermoplastic elastomeric molding compositions. Depending upon their compositional make-up, these compositions have a number of excellent and highly desirable physical properties including good flexibility, impact strength and/or moldability. In addition, compositions of the present invention exhibit excellent low temperature properties.

BACKGROUND OF THE INVENTION

Polyetherimide ester elastomers comprised of the reaction products of (a) a low molecular weight diol, (b) a dicarboxylic acid, (c) a high molecular weight poly(oxy alkylene)diamine, and (d) a tricarboxylic acid or its derivative are known and are described in U.S. Pat. Nos. 4,544,734 and 4,556,705 to McCready and in U.S. Pat. No. 4,556,688 to McCready et al. These polyetherimide esters exhibit excellent stress-strain properties, low modulus set, high melting temperatures and/or excellent strength/toughness characteristics as well as superior flexibility, which properties render said polyetherimide esters especially suitable for molding and extrusion applications.

SUMMARY OF THE INVENTION

The polyetherimide ester elastomers utilized in the present invention are well known elastomers and are described in U.S. Pat. Nos. 4,544,734 and 4,566,705 to McCready and in U.S. Pat. No. 4,566,688 to McCready et al., all of which are incorporated herein by reference.

Polymeric blends comprising polyetherimide ester elastomers modified by a poly(butylene terephthalate) polyester and a monoalkenyl arene-conjugated diene copolymer or copolymer composition are known in the art. These polymeric blends are known to have excellent physical properties. However, it has now been discovered that the low temperature properties of these polymeric blends can be substantially improved by adding to such blends a polycarbonate resin.

In accordance with the present invention there are provided improved thermoplastic elastomeric compositions having excellent flexibility and low temperature properties combined with superior surface characteristics comprising:

(A) one or more polyetherimide ester elastomers; and
(B) from about 10 to about 85 percent by weight, and preferably 30 to 70 percent by weight, based on the combined weight of (A) and (B), of a modifier combination comprising:
  (i) one or more poly(butylene terephthalate) homopolyesters or copolyesters;
  (ii) a monoalkenyl arene-conjugated diene rubbery copolymer selected from the group consisting of:
    (a) a block copolymer comprising at least two monoalkenyl arene polymer end blocks A and at least one hydrogenated, partially hydrogenated or non-hydrogenated conjugated diene polymer mid block B, said block copolymer having an 8 to 55 percent by weight monoalkenyl arene polymer block content, each polymer block A having an average molecular weight of between 5,000 and 125,000, and each block B having an average molecular weight of between about 10,000 and about 300,000; and
    (b) a core-shell graft copolymer comprising a predominately conjugated diene polymer core to which is grafted a shell polymerized from one or more monomers at least one of which is a monoalkenyl arene; and
  (iii) a polycarbonate resin;

wherein (a) the poly(butylene terephthalate) comprises from about 3 to about 60, preferably from about 10 to about 50, percent by weight of the total composition, (b) the monoalkenyl arene-conjugated diene copolymer comprises from about 3 to about 30, preferably from about 10 to about 15, percent by weight of the total composition, and (c) the polycarbonate resin comprises about 3 to about 60, and preferably from about 10 to about 50 percent by weight of the total composition.

In the most preferred compositions, the poly(butylene terephthalate) (B)(i) is poly(1,4-butylene terephthalate) and the monoalkenyl arene-conjugated diene copolymer is selected from non-hydrogenated block copolymers of polystyrene-polybutadiene-polystyrene and graft copolymers of a polybutadiene core with a polymethylmethacrylate/polystyrene shell.

DETAILED DESCRIPTION OF INVENTION

The polyetherimide ester elastomers utilized in the invention contain imide groups, polyether groups, and ester groups in the polymer chain. They are comprised of the reaction products of:

(i) at least one diol;
(ii) at least one dicarboxylic acid or its ester forming reactive derivative; and
(iii) a set of reactants selected from
  (a) (1) at least one high molecular weight poly(oxy alkylene)diamine, and (2) at least one tricarboxylic acid or its derivative, or
  (b) at least one high molecular weight polyoxyalkylene diimide diacid.

Suitable diols (i) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 300 or less. When used herein, the term "diol" and "low molecular weight diol" should be construed to include equivalent ester forming derivatives thereof provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4- cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis(p-hydroxy phenyl)methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids" as used herein, includes equivalents of dicarboxylic acids having two functional carboxyl groups which perform substantially like dicarboxylic acids in reaction with glycols and diols in forming polyesters. These equivalents include esters and ester forming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent groups(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxyic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radical such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethylsuberic acid, tetramethylsuccinic acid, cyclopentanedicarboxylic acid, decahydro-1,5 naphthlene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substitued dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8-16 carbon atoms are preferred, particularly the benzene dicarboxylic acids, i.e., phthalic, terephthalic and isophthalic acids and their dimethyl derivatives. Especially preferred is dimethylterephthalate.

Finally, where mixtures of dicarboxylic acids are employed in the practice of the present invention, it is preferred that at least about 60 mole %, preferably at least 80 mole %, based on 100 mole % of dicarboxylic acid (ii) be the same dicarboxylic acid or ester derivative thereof. As mentioned above, the preferred compositions are those in which dimethylterephthalte is the predominant dicarboxylic acid, most preferable when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a)(2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use in the present invention may be represented by the following general formula

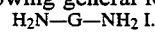  I.

wherein G is the radical remaining after the removal of the amino groups of a long chain alkylene ether diamine. These polyether diprimary diamines are available commericially from Texaco Chemical Company under the trademark JEFFAMINE. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236, 895 and French Nos. 1,551,605 and 1,466,708, all of the foregoing patents being incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide); terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsquently aminating are useful. Especially preferred poly(alkylene ether) diamines are poly(propylene ether)diamine, poly (tetramethylene ether)diamine, and the poly(ethylene)glycols which are end-capped with poly(propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-dipheneyl tricarboxylic anhydride, 3,3',5-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

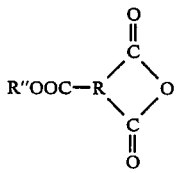

II.

wherein:
R is a trivalent organic radical, preferably a $C_1$–$C_{20}$ aliphatic or cycloaliphatic, or $C_6$–$C_{20}$ aromatic trivalent radical;
R" is preferably hydrogen or a monovalent organic radical which is preferably selected from $C_1$–$C_6$ aliphatic and/or cycloaliphatic radicals and $C_6$–$C_{12}$ aromatic radicals, e.g., benzyl; R" is most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly(oxy alkylene)diamine component, and (iii)(a)(2) a tricarboxylic acid component is described in U.S. Pat. No. 4,556,688 to McCready et al. incorporated herein by reference. In this type of one-pot reaction the amount of diol (i) employed will be, in general, a molar excess, preferably about 1.5 molar equivalents, based on the combined molar equivalents of diicarboxylic acid (ii) and of the total moles of the tricarboxylic acid (iii)(a)(2). The amount of the tricarboxylic acid employed will preferably be about two molar equivalents based on the number of moles of the poly(oxy alkylene) diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxy alkylene)diamine yield useful polymers.

The amount by which the diamine (iii)(a)(1) and the dicarboxylic acid (ii) are used is generally not critical in forming the polyetherimide esters of the present invention. However, preferred amounts of the poly(oxy alkylene)diamine and dicarboxylic acid used are such that the weight ratio of the theoretical amount of the polyoxyalklyene diimide diacid, formable from the poly(oxy alkylene)diamine and the tricarboxylic acid, to the dicarboxylic acid is from about 0.002 to 2.0:1, preferably from about 0.01 to 2.0:1, and more preferably from about 0.25 to 2.0, and most preferably from about 0.4 to 1.4. The actual weight ratio will be dependent upon the specific poly(oxy alkylene)diamine and tricarboxylic acid used and more importantly upon the desired physical and chemical properties of the resultant polyetherimide ester. In general, the lower ratio of the theoretical amount of polyoxyalklylene diimide diacid to dicarboxylic acid the better the strength, crystallization and heat distortion properties of the polymer. Alternatively, the higher the ratio, the better the flexibilty, tensile set and low temperature impact characteristics.

The instant polyetherimide esters may also be prepared by a two-pot synthesis involving the reaction of the diol (i), the dicarboxylic acid (ii), and the polyoxyalkylene diimide diacid (iii) (b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is then reacted with the diol and the dicarboxylic acid to form the polyetherimide ester polymers.

The polyoxyalkylene diimide diacid (iii)(b) may be represented by the general formula

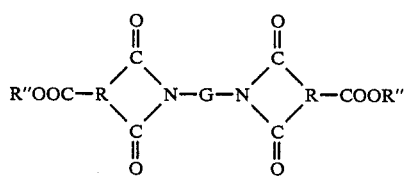

III.

wherein G, R and R" are as defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly (oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and dicarboxylic acid utilized is generally not critical in forming the polyetherimide esters of the present invention. However, preferred amounts of the polyoxyalkylene diimide diacid and dicarboylic acid are such that the weight ratio of the polyoxyalkylene diimide to the dicarboxylic acid is from about 0.002 to 2.01:1, preferably from about 0.01 to 2.01:1, more preferably from about 0.25 to 2.0:1, and most preferably from about 0.4 to 1.4:1.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxy alkylene)diamine. Forming the prepolyester can be achieved by conventional esterification techniques such as those described in U.S. Pat. Nos. 2,465,319 and 2,910,466, all of which are incorporated by reference.

In its preferred embodiment, the polyetherimide esters of the instant invention comprise the reaction products of dimethylterephthalate, optionally with up to 40 mole percent of another dicarboxylic acid or its ester forming derivative; butane diol, optionally with another diol such as butene diol, hexanediol, or cyclohexane dimethanol; and either a poly(oxy alkylene)diamine having and average molecular weight of from about 600 to about 12,000, preferably from about 900 to about 4,000, and trimellitic anhydride, or a polyoxyalkylene diimide diacid.

In the process of the present invention, particularly where all of the reactants are charged to the reactor together or where the polyoxyalklene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degrees of branching, while an excess of the tricarboxylic acid increases branching. In addition to controlling branching by varying the tricarboxylic acid/diamine mole ratio, one can compensate for branching by introducing a monofuctional reactant such as benzoic acid in minor amounts.

With refrence to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent will generally be less than about 0.15 moles per mole of diimide diacid. Useful branching agents other than trimellitic anhydride include trimethyl trimellitate, glycerol trimethylol propane, trimesic acid and its esters, and the like.

The instant polyetherimide esters may be prepared by conventional esterification/condensation reactions for the production of polyesters. These processes are described, inter alia, in U.S. Pat. Nos. 3,763,109; 3,651,014; 3,801,547; 4,556,705, and 4,556,688, all of which are incorporated herein by reference.

The polyetherimide esters of the instant invention contain at least the following two recurring structural units;

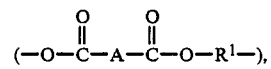

and

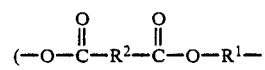

wherein:
A is the residue of the polyoxyalkylene diimide diacid absent the two carboxyl groups, i.e.,

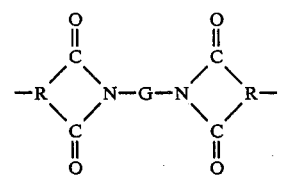

R₁ is the residue of the diol absent the two hydroxyl groups,
R₂ is the residue of the dicarboxylic acid absent the two carboxyl groups, and
G is as defined hereinafter.

Additionally, while not required, it is customary and preferred to utilize a catalyst or catalyst system in the process for the production of the present polyetherimide esters. These types of catalysts are set forth in U.S. Pat. Nos. 4,556,705 and 4,566,688, both of which are incorporated herein by reference.

Both batch and continuous methods can be used for any stage of the ether imide ester polymer preparation. Polycondensation of the polyester prepolymer with the polyoxyalklene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

The foregoing thermoplastic elastomers (A) are modified in accordance with the teachings of the instant invention by admixing therewith a modifying amount of a combination (B) of (i) one or more thermoplastic poly(butylene terephthalate) homopolymer or copolymer, (ii) one or more monoalkenyl arene-conjugated diene rubbery copolymer, and (iii) one or more polycarbonate resins.

While poly(1,4-butylene terephthalate)homopolyester is the preferred poly(butylene terephthalate) polymer, copolyesters thereof are also suitable. Such copolyesters generally comprise at least about 70 mole percent, and preferably at least 80 mole percent, based on total monomer content, of butylene and terephthalate units. The comonomer may be either a dicarboxylic acid or diol or a combination of the two. Suitable dicarboxylic acid comonomers include the $C_8$ to $C_{16}$ aromatic dicarboxylic acids, especially the benzene dicarboxylic acids, i.e. phthalic and isophthalic acids and their alkyl, e.g. methyl, derivatives and $C_4$ to $C_{16}$ aliphatic and cycloaliphatic dicarboxylic acids including the example sebacic acid; glutaric acid; azelaeic acid; tetramethyl succinic acid; 1,2-, 1,3- and 1,4-cyclohexane dicarboxylic acids and the life, as mentioned above. Suitable diol comonomers include but are not limited to $C_2$ to $C_8$ aliphatic and cycloaliphatic diols, e.g. ethylene glycol, hexanediol, butanediol and 1,2-, 1,3- and 1,4-cyclohexanedimethanol. Other suitable diols are well-known to those skilled in the art.

The monoalkenyl arene-conjugated diene copolymers suitable for use in the present invention are selected from ABA type block copolymers and core-shell type copolymers. Further, the term, "monoalkenyl arene-conjugated diene" copolymers is intended to include copolymers having addition comonomers therein as long as both monoalkenyl arene monomers and conjugated diene monomers are each present in an amount of at least about 10 mole percent based on total monomer content of the copolymer.

As stated above, suitable block copolymers (B)-(ii)(a) comprise at least two monoalkenyl arene polymer end blocks A and at least one hydrogenated, partially hydrogenated or non-hydrogenated conjugated diene polymer mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000.

These block copolymers may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. The specific structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the polymers or precursor polymers where hydrogenation of the final block polymer is desired, of three or more. Coupling may be effected with multi-functional coupling agents such as dihaloalkanes or dihaloalkenes and divinyl benzene as well as certain polar compounds such as silicon halides, siloxanes or esters or monohydric alcohols with carboxylic acids. The presence of any coupling residues in the polymer may be ignored for an adequate description of the polymers forming a part of the composition of this invention. Likewise, in the generic sense, the specific structures also may be ignored.

Various methods, including those as mentioned above, for the preparation of the block copolymers are known in the art. For example, such polymers, including processes for the hydrogenation thereof, where desired, are disclosed is U.S. Pat. Nos. 3,149,182; 3,595,947; 3,694,523; 3,287,333; 3,321,635 and 3,842,029, all incorporated herein by reference. In such processes, particular preference is made to the use of lithium based catalysts and especially lithium alkyls for the preparation of the block polymers.

Exemplary of typical species of block copolymers there may be given:
polystyrene-polybutadiene-polystyrene (SBS);
polystyrene-polyisoprene-polystyrene (SIS);
poly(alpha-methylstyrene)-polybutadiene-poly(alpha-methylstyrene); and
poly(alpha-methylstyrene)-polyisoprene-poly(alpha-methylstyrene).

It will be understood that both block A and B may be either homopolymer or random copolymer blocks as long as each block predominates in at least one class of the monomers characterizing the blocks and as long as the A block individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The B blocks may comprise homopolymers of butadiene or isoprene and copolymers of one of these two dienes with a monoalkenyl arene as long as the B blocks predominate in conjugated diene units. When the monomer employed is butadiene, it is preferred that between about 35 and about 55 mole percent of the condensed butadiene units in the butadiene polymer block have 1,2 configuration. Thus, when a hydrogenated or partially hydrogenated block copolymer is desired, it is or has segments which are or resemble a regular copolymer block of ethylene and butene-1 (EB). If the conjugated diene employed is isoprene, the resulting hydrogenated product is or resembles a regular copolymer block of ethylene and propylene (EP).

When hydrogenation of the block copolymer is desired, it may be and is preferably effected by use of a catalyst comprising the reaction products of an aluminum alkyl compound with nickel or cobalt carboxylates or alkoxides under such conditions as to preferably substantially completely hydrogenate at least 80% of the aliphatic double bonds while hydrogenating no more than about 25% of the alkenyl arene aromatic double bonds. Preferred hydrogenated block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000 preferably 7,000–60,000, while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 55% by weight of the block copolymer, preferably between about 10 and 30% by weight.

The second class of monoalkenyl arene-conjugated diene copolymers (B)(ii) are of the core-shell type. In general these are characterized as having a predominately conjugated diene rubbery core and one or more shells graft polymerized thereon and derived from monoalkenyl arene monomers alone or, preferably, in combination with other vinyl monomers.

More particularly, the first or core phase of the core-shell copolymer comprises polymerized conjugated diene units of one or more conjugated dienes alone or copolymerized with units of a vinyl monomer or mixture of vinyl monomers. Suitable conjugated dienes for use in said core phase include butadiene, isoprene, 1,3-pentadiene and the like. Illustrative of the vinyl monomers copolymerizeable therewith include the vinyl aromatic compounds such a styrene, alpha-methylstyrene, vinyl toluene, para-methylstyrene and the like; esters of acrylic and methacrylic acid, including for example methyl acrylate, ethyl acrylate, butyl acrylate, methyl methacrylate and ethyl methacrylate; and unsaturated aliphatic nitriles such as acrylonitrile, methacrylonitrile and the like. The core of said copolymer should comprise at least about 50 percent by weight of the conjugated diene. Preferred grafted core-shell copolymers for use herein comprise a core of polybutadiene homopolymer or a styrene-butadiene copolymer comprising about 10 to 50% by weight styrene and about 90 to 50% by weight of butadiene, having a molecular weight of from about 150,000 to about 500,000. The core phase may also include a cross-linking monomer, more particularly described below.

The final or shell phase of the copolymer comprises polymerized units of a monoalkenyl arene alone or copolymerized with one or more other vinyl monomers wherein at least 10 mole percent of the graft component is derived from the monoalkenyl arene monomer. Preferred monoalkenyl arene monomers are styrene, alpha-methylstyrene, para-methylstyrene and the like, most preferably styrene. Additional monomers that may be copolymerized therewith in an amount up to 90 mole % include the esters of acrylic and methacrylic acid including for example, ethyl acrylate, methyl actylate, butyl actylate, methyl methacrylate, ethyl methacrylate, butyl methacrylate and the like, unsaturated aliphatic nitrile such as acrylonitrile and methacrylonitrile and vinyl halides such as vinyl chloride and vinyl bromide. Especially preferred shells are those derived from polymerized units of styrene and methyl methacrylate wherein each is present in an amount of from 10 to 90 mole %. Additionally, these shells may also have copolymerized therewith a minor amount, preferably less than 10 mole % of one or more of the other aforementioned monomer units. As with the core, the shell phase may also include a cross-linking monomer as discussed more fully below.

Optionally, the core-shell copolymers may further comprise one or more cross-linked or non-cross linked intermediate layers which is grafted to the core and upon which the final shell layer is grafted, comprised of one or more polymerized vinyl monomer. Suitable vinyl monomers for one in these intermediate layers include but are not limited to those mentioned above, especially polystyrene. Where such intermediate layers are present in the core-shell copolymer and are derived from at least 10 mole % of a monoalkenyl arene monomer, the final or shell phase may comprise up to and including 100 mole % monomer units which are not monoalkenyl arene units. Especially preferred in such instances are multi-phase copolymers wherein the intermediate phase comprises polystyrene and the final stage comprises polymethylmethacrylate.

As mentioned each of the individual stages of the core-shell copolymers may contain a cross-linking monomer which may serve not only to cross-link the units of the individual layers but also graft-link the shell to the core. As the cross-linking agent for use in preparation of the core-shell copolymers, those which copolymerize smoothly with the monomer in the respective stages of the reaction should be selected. Representative cross-linking agents including, but are not limited to aromatic polyfunctional vinyl compounds such as divinyl benzene, trivinyl benzene, divinyl toluene and the like; di- and tri-methacrylates and di and triacrylates of polyols represented by monoethylene-, diethylene- and triethylene glycols, 1,3- butanediol and glycerin allyl esters of unsaturated aliphatic carboxylic acid such as allyl acrylate, allyl methacrylate and the like and di- and triallyl compounds such as diallyl phthalate, diallyl sebacate, triallytriazine and the like are mentioned.

While the amount of cross-linking agent employed is from about 0.01 to 3.0% by weight based on the monomer charge for each stage of the reaction, generally, the total amount of cross-linking agent in the final graft copolymer will preferably be less than 3.0 weight percent.

The core-shell copolymers suitable for use herein generally comprise from about 50 to about 90 weight percent of the core and from about 10 up to 50 weight percent of the graft or shell phase. Where an intermediate phase or layer is present in the graft copolymer the shell and intermediate phase will each comprise from about 5 to about 25 weight percent of the copolymer.

The core-shell graft copolymers for use in the present invention are prepared by the conventional method of emulsion polymerization, however, in an alternative method, graft copolymerization may be carried out after suitably coagulating the latex of cross-linked trunk polymer for adjusting the size of the latex particles of the trunk polymer.

Also, during polymerization the monomeric components used in the graft copolymerization may be brought into reaction in one step, or in multiple steps while supplying them in portions of suitable ratio of the present invention between the components.

Specific examples of suitable core-shell graft copolymers and the production thereof are disclosed in for example U.S. Pat. Nos 4,180,494 and 4,292,233; herein incorporated by reference. Commercially available grafted core-shell copolymers for use herein include KM653 and KM611 from ROHM and Haas Chemical Company.

Polycarbonates suitable for use in the present invention are any of those known in the art. Especially preferred polycarbonates are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.30 to 1.0 dl/g as measured in methylene chloride at 25 C. In one embodiment, the polycarbonate are derived from dihydric phenols and carbonate precursors and generally contain recurring structural units of the formula;

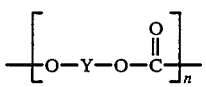

where Y is a divalent aromatic radical remaining after removal of the hydroxy groups from the dihydric phenol employed in the polycarbonate producing reaction, and n is greater than 1, preferably from about 10 to about 400.

Preferred polycarbonate resins are of the formula:

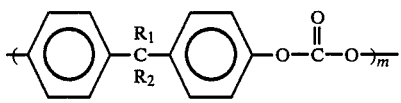

wherein $R_1$ and $R_2$ are independently hydrogen, (lower) alkyl orphenyl and m is at least 30 preferably between 40 and 300. The term (lower) alkyl includes hydrocarbon groups of from 1 to 6 carbon atoms.

Suitable dihydric phenols for producing polycarbonates include, for example,
2,2-bis(4-hydroxyphenyl)propane, bis(4-hydroxyphenyl)methane, 2,2-bis(4-hydroxy-3methylphenyl)propane, 4,4-bis(4-hydroxyphenyl) heptane, 2,2-(3,5,3',5'-tetrachloro-4,4'-dihydroxyphenyl)propane, 2,2-(3,5,3',5'-tetrabromo-4,4'-dihydroxyphenol)propane, and 3,3'-dichloro-4,4'-dihydroxydiphenyl)methane.

Other dihydric phenols which are also suitable for use in the preparation of the above polycarbonates are disclosed in U.S. Pat. Nos. 2,999,835; 3,038,365; 3,169,121; 3,334,154; and 4,131,575, incorporated herein by reference.

It is, of course, possible to employ two or more different dihydric phenols or a copolymer of a dihydric phenol with a glycol or with a hydroxy or acid terminated polyester, or with a diabasic acid in the event a carbonate copolymer or interpolymer rather than a homopolymer is desired for use in the preparation of the blends of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate; a di(halophenyl)carbonate such as di(trichlorophenyl) carbonate, di(tribromophenyl)carbonate, etc.; di(alkylphenyl) carbonate such as di(tolyl)carbonate, etc.; di(naphthyl)carbonate; di(chloronaphthyl)carbonate; etc., or mixtures thereof. The suitable haloformated include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described by Clayton B. Quinn in U.S. Pat. No. 4,430,484 and Kenneth Miller in U.S. Pat. No. 4,465,820. and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g. dichlorides. A quite useful class of polyestercarbonates are the aromatic polyester carbonates derived from bisphenol A; terephthalic acid or isophthalic acid or a mixture thereof or their respective acid chlorides; and phosgene. If a mixture of terephthalic acid and isophthalic acid is employed, the weight ratio of terephthalic acid to isophthalic acid may be from about 2:8 to about 8:2.

The polycarbonates of the subject blends can be manufactured by known processes, such as, for example, by reacting a dihydric phenol with a carbonate precursor such as diphenyl carbonate or phosgene in accordance with methods set forth in the above-cited literature and U.S. Pat. Nos. 4,018,750 and 4,123,436, or by transesterification processes such as are disclosed in the U.S. Pat. No. 3,153,008, as well as other processes known to those skilled in the art. The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalyst which can be employed are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, promellitric acid, pyromellitic dianhydride, mellitic acid, mellitic anhydride, trimesic acid, benzophenonetetracarboxylic acid, benxophenonetetracarboxylic anhydride, and the like. The preferred polyfunctional aromatic compounds are trimellitic anhydride and trimellitic acid or their acid halide derivatives.

The modifier combination (B) comprises from about 10 to about 85 weight percent, preferably from about 30 to about 70 weight percent, based on the total composition. Individually, the modifiers comprising the modifier combination will each be present as follows:

- the poly(butylene terephthalate) (B)(i) comprises from about 3 to about 60, preferably from about 10 to about 50, percent by weight of the total composition.
- the monoalkenyl arene-conjugated diene copolymer (B)(ii) comprises from about 3 to about 30, preferably from about 10 to about 15, percent by weight of the total composition.
- the polycarbonate resin comprises from about 3 to about 60, preferably from about 10 to about 50 weight percent based on the total weight of composition.

Finally, while the foregoing is concerned with precompounding of the core-shell copolymer, the concept of precompounding is equally applicable to the block copolymer. Similarly, is is anticipated that the precompounding of the block copolymer with the poly(butylene terephthalate) will result in enhanced physical properties due to the improved dispersibility thereof.

The instant compositions may also optionally contain such commonly known and used additives as oxidative stabilizers; thermal stabilizers, ultraviolet radiation stabilizers; and fillers.

Many of the oxidative and/or thermal stabilizers known in the art for thermoplastic polymers may be used in the practice of the present invention. These may be incorporated either during polymerization or while in a hot melt stage following polymerization. Satisfactory stabilizers of this type include the phenols and their derivatives, compounds containing both hydroxyl and amine groups, hydroxyazines, oximes, polymeric phenolic esters, and salts of multivalent metals in which the metal is in its lower valence state. Some specific examples of these stabilizers are described in U.S. Pat. No. 4,556,688, incorporated herein by reference.

The ultraviolet radiation stabilizers include, but are not limited to, the benzophenone derivatives, benzotriazole derivatives, and cyanoacrylates.

The fillers include, but are not limited to, carbon black, silica gel, alumina, clays, talc, and chopped fiberglass or glass particles. These fillers may be incorporated in amounts up to about 50 weight percent, preferably up to about 30 weight percent.

The compositions of the present invention may be prepared by any of the well-known techniques for preparing the polymer blends or admixtures, with extrusion blending being preferred. Suitable devices for the blending include single screw extruders, twin screw extruders, internal mixers such as the Bambury Mixer, heated rubber mills (electric or oil heat) or Farrell continuous mixers. Injection molding equipment can also be used to accomplish blending just prior to molding, but care must be taken to provide sufficient time and agitation to insure uniform blending prior to molding.

Alternatively, the ingredients may be dry blended prior to extrusion or injection molding.

Finally, as mentioned above, the modifier combination may be pre-compounded prior to compounding with the polyetherimide ester resin.

DESCRIPTION OF THE PREFERRED EMBODIMENT

The following examples are presented to more fully and clearly illustrate the present invention. They are presented as illustrative of the invention and are not to be construed as limiting the invention thereto. In the examples all parts and percentages are on a weight basis unless otherwise specified.

All compositions were prepared by melt blending the thermoplastic elastomer with the thermoplastic polyester in a Prodex single screw extruder.

Physical properties of these compositions were determined in accordance with ASTM methods as follows:

| | |
|---|---|
| Notched Izod | ASTM D256 |
| Flexural Modulus | ASTM D790 |
| Tensile Strength | ASTM D638 |
| Tensile Elongation | ASTM D638 |

Dynatub is a measure of stress-strength properties of the composition and is expressed as Emax/Etotal wherein Emax is the maximum energy the standard part can withstand under deflection before permanent deformation (i.e., non-recoverable deflection) and Etotal is the total energy the part can withstand before mixture.

In all examples, the stabilizers that were used were phenolic and/or amine stabilizers typical for such compositions.

Examples 1 and 12 are outside the scope of the present invention and illustrate the prior art compositions which did not contain the polycarbonates component in the modifier composition. In Examples 1 through 11, inclusive, the polyetherimide ester resin which was utilized had a modulus of 10,000. In Examples 12 and 13, the polyetherimide ester resin utilized had a modulus of 50,000. (Table 1 sets forth the composition of each of the Examples 1 through 13, inclusive. Table 2 sets forth the physical characteristics of each of the compositions.)

TABLE 1

| | EXAMPLE NO. | | | | | | |
|---|---|---|---|---|---|---|---|
| | 1 | 2 | 3 | 4 | 5 | 6 | 7 |
| PEE | 40 | 25 | 35 | 39.2 | 30 | 20 | 29.2 |
| KM 653/315 | 30 | 30 | 30 | 30 | 30 | 30 | 30 |
| Lexan 101 | — | 20 | 20 | 30 | 30 | 30 | 40 |
| Valox 315 | 29.5 | 24.2 | 14.2 | — | 9.2 | 19.2 | — |
| Stabilizer | 0.5 | 0.8 | 0.8 | 0.8 | 0.8 | 0.8 | 0.8 |
| SDP | — | — | — | — | — | — | — |
| P | — | — | — | — | — | — | — |

| | 8 | 9 | 10 | 11 | 12 | 13 |
|---|---|---|---|---|---|---|
| PEE | 20 | 19.2 | 39.2 | 19.2 | 40 | 19.2 |
| KM 653/315 | 30 | 30 | 30 | 30 | 30 | 30 |
| Lexan 101 | 40 | 50 | 29 | 49 | — | 49 |
| Valox 315 | 9.2 | — | — | — | 28.5 | — |
| Stabilizer | 0.8 | 0.8 | 0.5 | 0.5 | 0.5 | 0.5 |

TABLE 1-continued

| | EXAMPLE NO. | | | | | |
|---|---|---|---|---|---|---|
| SDP | — | — | 0.3 | 0.3 | — | 0.3 |
| P | — | — | 1.0 | 1.0 | — | 1.0 |

PEE is LOMOD ® polyetherimide ester resin available from the General Electric Company.
KM 653/315 is a concentration of a butadiene based core-shell impact modified (KM 653 from Rohn & Haas) in a poly(butylene terephthalate) resin from General Electric Company (Valox ® 315) in a 50:50 weight ratio.
Lexan ® 101 is a polycarbonate resin from General Electric Company.
SDP is a phosphate stabilizer.
P is a pigment.
The stabilizer was a hindered phenolic stabilizer.

TABLE 2

| | EXAMPLE NO. | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 | 13 |
| ⅛" Notched Izod, Room Temp., ft. lbs/in. | NB | NB | NB | NB | NB | NB | NB | NB | NB | 9 | 8 | 11 | 9 |
| ⅛" Notched Izod, −30 C., ft. lbs/in. | 2 | 2 | 3 | 4 | 4 | 3 | 4 | 3 | 5 | 3 | 4 | 1 | 4 |
| Dynatub, −30 C. Emax/Etotal | 19/30 | 24/36 | 22/29 | 23/31 | 26/35 | 24/31 | 27/34 | 28/36 | 34/38 | 22/28 | 27/31 | 16/20 | 31/36 |
| Tensile Strength, psi | 3.9K | 4.6K | 4.6K | 4.2K | 4.9K | 6.0K | 5.2K | 6.4K | 6.6K | 4.3K | 7.2K | 4.9K | 6.9K |
| Tensile Elongation, % | 260 | 220 | 180 | 130 | 160 | 170 | 140 | 170 | 140 | 130 | 150 | 230 | 90 |
| Flexural Modulus, psi | 107K | 149K | 123K | 107K | 143K | 191K | 164 | 215K | 232K | 113K | 230K | 136K | 286K |

NB = no break

An example of the data set forth in Table 2 indicates that the compositions of the present invention which contain a polycarbonate in the modifier combination for the polyetherimide ester resin show unexpected low temperature properties, as set forth in the data for the low temperature Notched Izod test and the Dynatub test, without sacrificing other properties.

Obviously, other modifications and variations of the present invention are possible in light of the above teachings. It is therefore to be understood that changes may be made in the particular embodiments of the invention described which are within the full intended scope of the invention as defined by the appended claims.

What is claimed is:

1. A thermoplastic molding composition comprising:
   (A) at least one polyetherimide ester resin;
   (B) a modifier combination consisting essentially of:
      (i) one or more poly(butylene terephthalate) homopolyesters or copolyesters;
      (ii) a monoalkenyl arene-conjugated diene rubber copolymer selected from the group consisting of:
         (a) a block polymer comprising at least two monoalkenyl arene polymer end block A and at least one hydrogenated, partially hydrogenated or non-hydrogenated conjugated diene polymer mid block B, said block copolymer having an 8 to 55 percent by weight monoalkenyl arene polymer block content, each polymer block A having an average molecular weight of between 5,000 and 125,000, and each polymer block B having an average molecular weight of between about 10,000 and about 300,000; and
         (b) a core-shell graft copolymer comprising a predominately conjugated diene polymer core to which is grafted a shell polymerized from one or more monomers at least one of which is a monoalkenyl arene; and
      (iii) one or more aromatic polycarbonate resins.

2. The composition of claim 1 wherein the poly(butylene terephthalate) comprises from about 3 to about 60 percent by weight of the total composition, (b) the monoalkenyl arene-conjugated diene copolymer comprises from about 3 to about 30 percent by weight of the total composition, and (c) the polycarbonate contains from about 3 to about 60 percent by weight based on the total composition.

3. The composition of claim 1 wherein the modifying combination (B) comprises from about 10 to about 85 percent by weight of the total composition.

4. The composition of claim 1 wherein the poly(butylene terephthalate) is poly(1,4-butylene terephthalate) homopolyester.

5. The composition of claim 1 wherein the monoalkenyl arene-conjugated diene copolymer is a block copolymer.

6. The composition of claim 5 wherein the block copolymer is polystyrene-polybutadiene-polystyrene block copolymer.

7. The composition of claim 1 wherein the monoalkenyl arene-conjugated diene copolyner is a core-shell copolymer.

8. The composition of claim 7 wherein the core-shell copolymer is comprised of a polybutadiene core having polymerized thereon a shell derived from styrene and methylmethacrylate units.

9. The composition of claim 7 wherein the core-shell is copolymer is comprised of a poly(butadiene-styrene) core having polymerized thereon a shell derived from styrene and methylmethacrylate.

10. The composition of claim 1 wherein the monoalkenyl arene-conjugated diene copolymer is precompounded with at least a portion of the poly(butylene terephthalate).

11. The composition of claim 10 wherein the monoalkenyl arene-conjugated diene copolymer is a core-shell copolymer.

12. The composition of claim 1 wherein the aromatic polycarbonate resin is derived from a diphenol and phosgene or a phosgene precursor.

13. The composition of claim 12 wherein the aromatic polycarbonate resin is poly(biphenol A)carbonate.

14. The composition of claim 1 wherein said polyetherimide ester resin is comprised of the reaction products of:
(a) at least one diol;
at least one dicarboxylic acid or an ester forming reactive derivative thereof; and
(c) a set of reactants selected from
(1) (i) at least one high molecular weight poly(oxy alkylene)diamine, and (ii) at least one tricarboxylic acid or a derivative thereof, or
(2) at least one high molecular weight polyoxyalkylene diimide diacid.

15. The composition of claim 14 wherein said diol is a low molecular weight diol.

16. The composition of claim 14 wherein said diol has a molecular weight of about 300 or less.

17. The composition of claim 14 wherein said diol contains from 2 to about 15 carbon atoms.

18. The composition of claim 17 wherein said diol is selected from butanediol, butenediol, hexanediol, cyclohexane dimethanol, or mixtures thereof.

19. The composition of claim 18 wherein said diol is butanediol.

20. The composition of claim 14 wherein said dicarboxylic acid or its derivative is an aromatic dicarboxylic acid or its derivative.

21. The composition of claim 20 wherein said aromatic dicarboxylic acid or its derivative is dimethylterephtalate.

22. The composition of claim 14 wherein (c) is (1).

23. The composition of claim 22 wherein said high molecular weight poly(oxy alkylene)diamine is represented by the formula $$H_2N-G-NH_2$$

wherein G is the radical remaining after the removal of the amino groups of a long chain alkylene ether diamine.

24. The composition of claim 23 wherein said poly(oxy alkylene)diamine has an average molecular weight of from about 600 to about 12,000.

25. The composition of claim 24 wherein said poly(oxy alkylene)diamine has an average molecular weight of from about 900 to about 4,000.

26. The composition of claim 24 wherein said poly(oxy alkylene)diamine is selected from poly(ethylene ether)diamine, poly(propylene ether)diamine, poly (tetramethylene ether)diamine, copoly(propylene etherethylene ether)diamine, or mixtures thereof.

27. The composition of claim 22 wherein said tricarboxylic acid or its derivative is represented by the formula

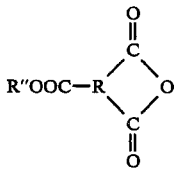

wherein R is a $C_1$ to $C_{20}$ trivalent aliphatic, cycloaliphatic or aromatic radical, and R" is hydrogen or a $C_1$-$C_6$ aliphatic monovalent radical.

28. The composition of claim 27 wherein said tricarboxylic acid or its derivative is trimellitic anhydride.

29. The composition of claim 14 wherein (c) is (2).

30. The composition of claim 29 wherein said high molecular weight polyoxyalkylene diimide diacid is represented by the formula

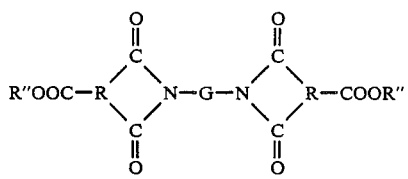

wherein:
each R is independently selected from $C_1$-$C_{20}$ aliphatic, cycloaliphatic or aromatic trivalent organic radicals;
each R" is independently selected from hydrogen, $C_1$-$C_6$ aliphatic or cycloaliphatic organic radicals, or $C_6$-$C_{12}$ aromatic monovalent organic radicals; and
G is the radical remaining after the removal of the amino groups of a long chain alkylene ether diamine.

31. The composition of claim 30 wherein said long chain alkylene ether diamine has an average molecular weight of from about 600 to about 12,000.

32. The composition of claim 31 wherein said long chain alkylene ether diamine has an average molecular weight of from about 900 to about 4,000.

33. The composition of claim 32 wherein each R is a $C_6$ trivalent aromatic hydrocarbon radical and each R" is hydrogen.

34. The composition of claim 1 wherein said polyetherimide ester resin is comprised of at least the following recurring structural units:

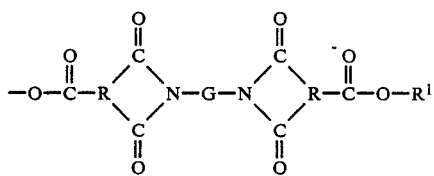

and

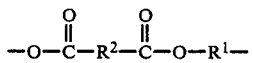

wherein:
$R^1$ is the residue of a diol absent the two hydroxyl groups;
$R^2$ is the residue of a dicarboxylic acid absent the two carboxyl groups;
R is a trivalent organic radical; and
G is the radical remaining after the removal of the amino groups of a long chain poly(oxy alkylene) diamine.

35. The composition of claim 34 wherein said poly(oxy alkylene)diamine has an average molecular weight of from about 600 to about 12,000.

36. The composition of claim 35 wherein said poly(oxy alkylene)diamine has an average molecular weight of from about 900 to about 4,000.

37. The composition of claim 34 wherein $R^2$ is the residue of an aromatic dicarboxylic acid.

38. The composition of claim 37 wherein $R^2$ is the residue of dimethylterephthalate.

39. The composition of claim 37 wherein $R^1$ is the residue of a diol having a molecular weight of about 250 or less.

40. The composition of claim 39 wherein said diol is selected from butanediol, butenediol, hexanediol, cyclohexane dimethanol or mixtures thereof.

41. The composition of claim 40 wherein said diol is butanediol.

42. The composition of claim 1 which further contains an effective stabilizing amount of at least one thermal stabilizer.

43. The composition of claim 1 which further contains a filler.

* * * * *